(12) United States Patent
Lin et al.

(10) Patent No.: US 10,054,762 B2
(45) Date of Patent: Aug. 21, 2018

(54) OPTICAL COMPONENT HOLDER HAVING ALIGNMENT FEATURE FOR FORMING PRESS-FIT AND AN OPTICAL SUBASSEMBLY USING SAME

(71) Applicant: Applied Optoelectronics, Inc., Sugar Land, TX (US)

(72) Inventors: Kai-Sheng Lin, Sugar Land, TX (US); Hao-Hsiang Liao, Sugar Land, TX (US); Justin Lii, Houston, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/370,559

(22) Filed: Dec. 6, 2016

(65) Prior Publication Data

US 2018/0157005 A1    Jun. 7, 2018

(51) Int. Cl.
| | | |
|---|---|---|
| G02B 7/182 | (2006.01) | |
| G02B 6/42 | (2006.01) | |
| H04B 10/00 | (2013.01) | |
| H04B 10/66 | (2013.01) | |

(52) U.S. Cl.
CPC .......... G02B 7/1824 (2013.01); H04B 10/66 (2013.01)

(58) Field of Classification Search
CPC .......... G02B 7/003; G02B 7/006; G02B 7/02; G02B 7/182; G02B 7/1822; G02B 7/184; G02B 6/42; G02B 6/4201; G02B 6/4256; G02B 6/432; G01J 1/0271; G01J 1/0403; G01J 3/0291; H04B 1/03; H04B 10/66
USPC .......... 359/629, 809, 811, 871, 892; 385/92; 398/135, 140, 182, 202
See application file for complete search history.

(56) References Cited

U.S. PATENT DOCUMENTS

| | | | | |
|---|---|---|---|---|
| 6,542,306 B2* | 4/2003 | Goodman | .......... | G02B 6/29367 359/629 |
| 7,218,451 B2* | 5/2007 | Lee | .......... | G02B 6/12007 359/246 |
| 7,296,938 B1* | 11/2007 | Shapson | .......... | G02B 6/3891 385/76 |

(Continued)

OTHER PUBLICATIONS

PCT Search Report and Written Opinion dated Jan. 12, 208, received in corresponding PCT Application No. PCT/US17/64920, 6 pgs.

*Primary Examiner* — Frank Font
(74) *Attorney, Agent, or Firm* — Grossman Tucker Perreault & Pfleger, PLLC; Norman S. Kinsella

(57) ABSTRACT

An optical component holder having a base portion with a chamfered (or step) portion is disclosed herein that allows a technician to position and partially insert the same within an associated opening using a relatively minor amount of force. The chamfered portion of the base portion operates, in a general sense, as a guide that ensures proper alignment of the optical component holder and allows the same to travel a predetermined distance within the opening before being blocked from further travel by "bottoming" out when the wider portion of the base is at the edge of the associated opening. Thus, the chamfered portion provides an alignment feature to provide tactile feedback that indicates to the technician that the optical component holder is aligned and evenly inserted into an associated opening prior to supplying additional force to press the optical component holder fully into a housing.

19 Claims, 8 Drawing Sheets

(56) References Cited

U.S. PATENT DOCUMENTS

| | | | |
|---|---|---|---|
| 7,623,788 B2* | 11/2009 | Takahashi | G02B 6/4206 |
| | | | 359/629 |
| 8,437,086 B2* | 5/2013 | Du | H01S 5/405 |
| | | | 359/618 |
| 2005/0147419 A1* | 7/2005 | Verdiell | H01S 5/4087 |
| | | | 398/214 |
| 2012/0002293 A1* | 1/2012 | Du | H01S 5/4012 |
| | | | 359/629 |
| 2016/0139351 A1* | 5/2016 | Okada | G02B 6/4225 |
| | | | 385/33 |
| 2017/0059394 A1* | 3/2017 | Ho | G01J 1/0271 |
| 2017/0075079 A1* | 3/2017 | Lin | G02B 6/32 |

\* cited by examiner

OPTICAL COMPONENT HOLDER HAVING ALIGNMENT FEATURE FOR FORMING PRESS-FIT AND AN OPTICAL SUBASSEMBLY USING SAME

TECHNICAL FIELD

The present disclosure is generally related to an optical component holder for positioning optical components within an optical subassembly, and more specifically to an optical component holder having a profile that allows for self-alignment when forming a press-fit between an optical subassembly and the optical component holder.

BACKGROUND

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, and manufacturing yield. Optical transceivers can include one or more transmitter optical subassemblies (TOSAs) and receiver optical subassemblies (ROSAs) for the purpose of transmitting and receiving optical signals. As channel density and increased speed becomes an increasingly important aspect of optical transceivers, the ability to scale-down while maintaining nominal transceiver performance raises numerous non-trivial challenges.

BRIEF DESCRIPTION OF THE DRAWINGS

These and other features and advantages will be better understood by reading the following detailed description, taken together with the drawings, wherein.

DETAILED DESCRIPTION

Figure 1:
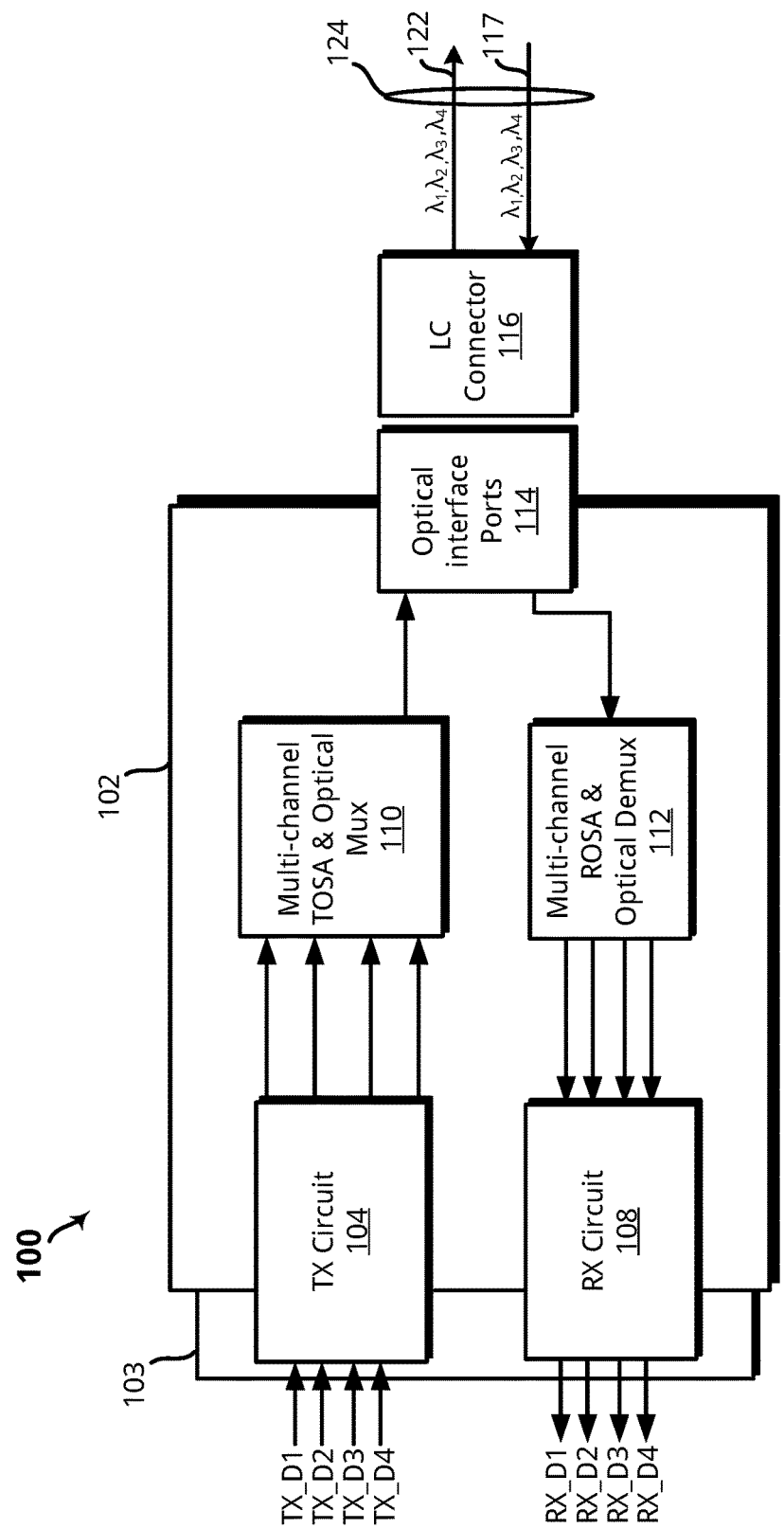
FIG. 1 schematically illustrates an embodiment of an optical transceiver including a multi-channel transmitter optical subassembly (TOSA) and multi-channel receiver optical subassembly (ROSA).

Optical communication systems may utilize one or more optical transceivers that use optical subassemblies, such as transmitter optical subassemblies (TOSAs) and receiver optical subassemblies (ROSAs), for sending and receiving optical signals. Optical subassemblies may include one or more optical components, e.g., filters, mirrors, and lenses, disposed in a housing for receiving and generating optical signals, as the case may be. Each optical component may optically align along a beam path that extends through the housings such that optical signals may be launched or received at nominal power. A misalignment of one or more optical components, even in the order of microns, may significantly affect the performance of an optical subassembly. Such misalignment may be inadvertently introduced when press-fitting components as components may be unevenly inserted/hammered into an associated opening.

Accordingly, an optical component holder having a base portion with a chamfered (or step) portion is disclosed herein that allows a technician to position and partially insert the same within an associated opening using a relatively minor amount of force, such as user-supplied force via a user's hands. The chamfered portion of the base portion operates, in a general sense, as a guide that ensures proper alignment of the optical component holder and allows the same to travel a predetermined distance within the opening before being blocked from further travel by "bottoming" out when the wider portion of the base is at the edge of the associated opening. Thus, the chamfered/step portion provides an alignment feature to provide tactile feedback that indicates to the technician that the optical component holder is aligned and evenly inserted into an associated opening prior to supplying additional force, e.g., via a hammer, to press the optical component holder fully into a housing. Accordingly, insertion of an optical component holder in accordance with embodiments of the present disclosure advantageously eliminates fixtures and other apparatuses that other approaches utilize to ensure a component is properly aligned prior to hammering.

In an embodiment, the optical component holder includes one or more sidewalls that define the base portion. The base portion includes a first surface that forms a substantially continuous surface with a sidewall of an optical subassembly housing after fully inserting the optical component holder into an associated opening. The first surface of the base portion may be generally referred to herein as a housing sidewall surface. The base portion further includes at least one second surface opposite the first surface, with the at least one second surface being generally referred to herein as a mounting surface to couple to, for example, a mirror, filter, lens, or other optical component. At least one sidewall may extend between the mounting surfaces and the housing sidewall surface. The at least one sidewall may include a chamfered/step portion adjacent the mounting surfaces that extends continuously around the perimeter of the base. The chamfered/step portion may be recessed/offset relative to a surface of the at least one sidewall by a distance of about 0.01 mm or more, although other offsets may be utilized and are also within the scope of this disclosure.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one component is imparted to another component. Such "coupled" devices are not necessarily directly connected to one another and may be separated by intermediate components or devices that may manipulate or modify such signals.

Now turning to FIG. 1, there is an optical transceiver 100 consistent with embodiments of the present disclosure. In more detail, the optical transceiver 100 transmits and receives four (4) channels using four different channel wavelengths ($\lambda_1, \lambda_2, \lambda_3, \lambda_4$) and may be capable of transmission rates of at least about 25 gigabits (Gbs) per channel or more. In one example, the channel wavelengths $\lambda_1, \lambda_2, \lambda_3, \lambda_4$ may be 1270 nm, 1290 nm, 1310 nm, and 1330 nm, respectively. The optical transceiver 100 may also be capable of both short transmission distances of tens of meters, for example, to distances of 2 kilometers or more. The optical transceiver 100 may be used, for example, in internet data center applications or fiber to the home (FTTH) applications. In an embodiment, the optical transceiver 100 implements a Quad Small Form-Factor Pluggable (QSFP) transceiver. For example, the optical transceiver 100 may be implemented within a QSFP transceiver that comports with the QSFP28 specification as discussed above. The aspects and embodiments disclosed herein may be used within other transceiver types and is not necessarily limited to QSFP or QFSP+ transceivers. The optical transceiver 100 may be configured for dense wavelength division multiplexing (DWDM) or course wavelength division multiplexing (CWDM), depending on a desired configuration. Although aspects and scenarios disclosed herein may discuss a four (4) channel configuration, other channel configurations, e.g., 2, 4, 16, 32, and so on, are within the scope of this disclosure.

As shown, the optical transceiver 100 includes a transceiver housing 102 that may include a multi-channel TOSA arrangement 110 for transmitting optical signals on different channel wavelengths, and a multi-channel ROSA arrangement 112 for receiving optical signals on different channel wavelengths within a single transceiver housing. A transmit connecting circuit 104 and a receive connecting circuit 108 provide electrical connections to the multi-channel TOSA arrangement 110 and the multi-channel ROSA arrangement 112, respectively, within the transceiver housing 102. The transmit connecting circuit 104 and the receive connecting circuit 108 may communicate with external systems via data bus 103. In some cases, data bus 103 is a 38-pin connector that comports with physical connector QSFP standards and data communication protocols.

In any event, the transmit connecting circuit 104 electrically couples to the electronic components in the multi-channel TOSA arrangement 110, e.g., laser assemblies, and the receive connecting circuit 108 electrically couples to the electronic components in the multi-channel ROSA arrangement 112, e.g., an arrayed waveguide grating (AWG), detectors, amplification circuitry and so on. The transmit connecting circuit 104 and the receive connecting circuit 108 include at least conductive paths to provide electrical connections, and may also include additional circuitry. The multi-channel TOSA arrangement 110 transmits and multiplexes multiple different channel wavelengths, and is coupled to an optical interface port 114. The optical interface port 114 may include an LC connector port, although other connector types are also within the scope of this disclosure.

In cases where the optical interface port 114 comprises a duplex, or bi-directional, LC receptacle, the LC connector receptacle provides optical connections to the multi-channel TOSA arrangement 110, and provides optical connections to the multi-channel ROSA arrangement 112. The LC connector receptacle may be configured to receive and be coupled to a mating LC connector 116 such that the transmit optical fiber 122 of the external fibers 124 optically couples to the multi-channel TOSA arrangement 110, and the receive optical fiber 117 of the external fibers 124 optically couples to the multi-channel ROSA arrangement 112.

The multi-channel TOSA arrangement 110 can include multiple laser packages and optics for producing associated channel wavelengths, and can couple the same into the transmit optical fiber 122. In particular, the lasers in the multi-channel TOSA arrangement 110 can convert electrical data signals (TX_D1 to TX_D4) received via the transmit connecting circuit 104 into modulated optical signals transmitted over the transmit optical fiber 122. The lasers may include, for example, distributed feedback (DFB) lasers with diffraction gratings. In other cases, the lasers may comprise electro-absorption modulated laser (EML) laser diode packages. The multi-channel TOSA arrangement 110 may also include monitor photodiodes for monitoring the light emitted by the lasers. The multi-channel TOSA arrangement 110 may further include one or more temperature control devices, such as a resistive heater and/or a thermoelectric cooler (TEC), for controlling the temperature of the lasers, for example, to control or stabilize the laser wavelengths.

The multi-channel ROSA arrangement 112 can include de-multiplexing optics such as an AWG device and a plurality of detectors such as photodiode packages configured to receive de-multiplexed channel wavelengths. The ROSA arrangement 112 can use the detectors and associated circuitry (e.g., a TIA) to detect, amplify, and convert de-multiplexed channel wavelengths and can provide the same as electrical data signals, e.g., RX_D1 to RX_D4. Each of the optical components may be coupled to the TOSA arrangement 110 and/or the ROSA arrangement 112 using an optical component holder, as will be discussed further herein.

Example Optical Component Holder

Figure 2:
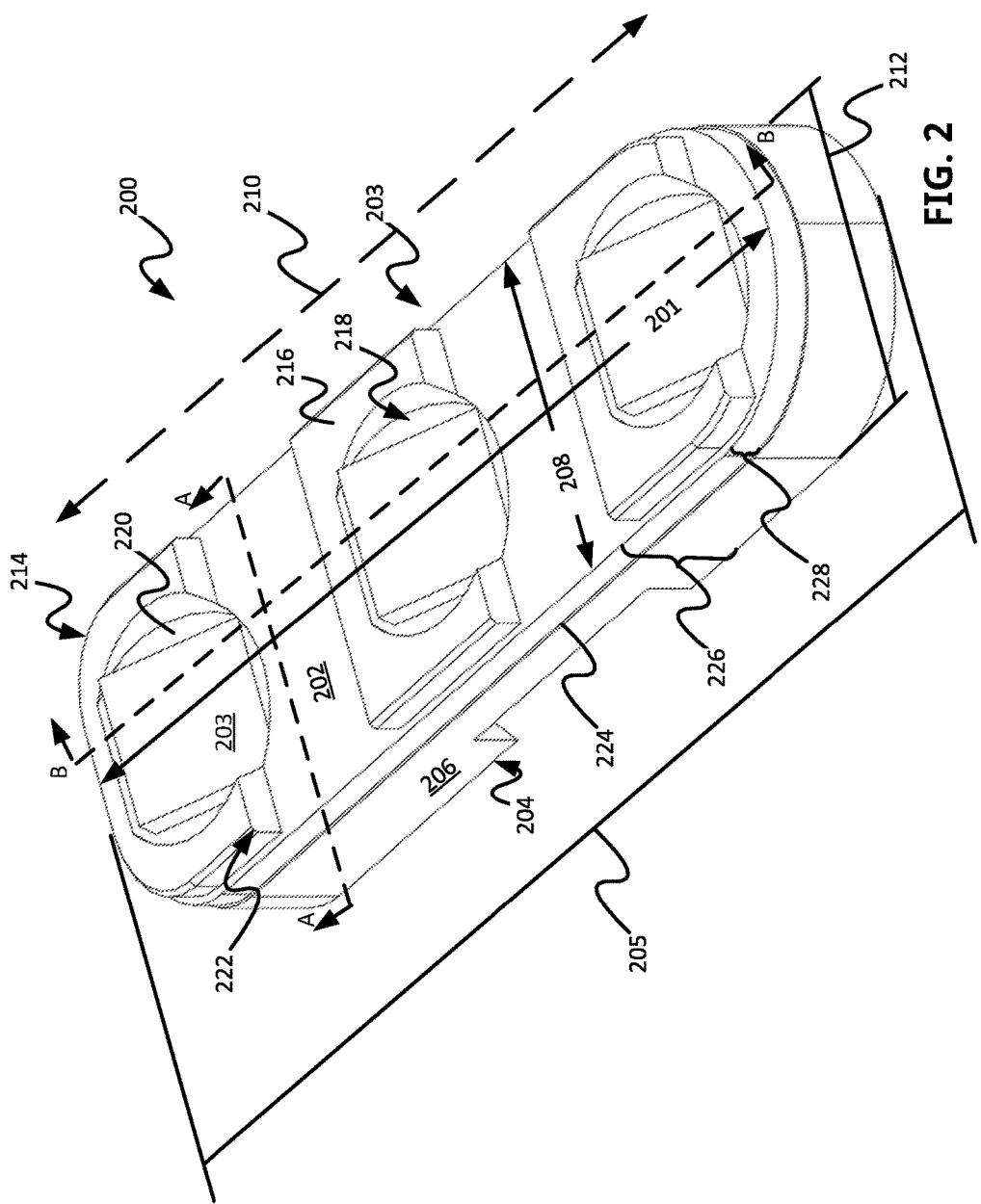
FIG. 2 is a perspective view of an embodiment of an optical component holder, consistent with embodiments of the present disclosure.

FIG. 2 shows an embodiment of an optical component holder 200 consistent with embodiments of the present disclosure. As shown, the optical component holder 200 includes an elongated base portion 226 having a mounting region 214 opposite a housing surface 204 and at least one holder sidewall 206 extending between the mounting surface 202 and the housing surface 204. The mounting region 214 includes a mounting surface 202. The mounting surface 202 may be defined by at least one mounting surface width 208 that measures a distance transverse to a longitudinal axis 210 of the optical component holder 200 and a mounting surface length 201 that measures a distance parallel to the longitudinal axis 210. The mounting surface length 201 may measure greater than the mounting surface width 208. The housing surface 204 may be defined, at least in part, by at least one housing surface width 212 that measures a distance transverse to the longitudinal axis 210 and a housing surface length 205 that measures a length parallel to the longitudinal axis 210.

The housing surface length 205 may measure greater than the housing surface width 212. In some instances, the mounting surface width 208 measures less than the housing surface width 212 and/or the mounting surface length 201 measures less than the housing surface length 205. The at least one holder sidewall 206 transitions between at least one of the housing surface width 212 and the mounting surface width 208 and/or the housing surface length 205 and the mounting surface length 201 to form a step/chamfer region. Stated differently, the sidewall may include at least a first diameter (or width) defined by mounting surface width 208 that transitions to a second diameter (or width) defined by the housing surface width 212. The first and second diameters may be uniform/continuous around a perimeter of the at least one holder sidewall 206.

In operation, the transition in the holder sidewall 206 may act as an alignment feature such that a portion of the optical component holder 200 can be received within an opening prior to forming a press-fit between a sidewall of the opening and the holder sidewall 206. In other words, the transition in the holder sidewall 206 may guide and pre-position the optical component holder 200 relative to an opening by positioning a portion of the optical component holder 200 within the opening prior to forming a press-fit.

The transition in the at least one holder sidewall 206 may include, for example, a stepped region 224 which may also be referred to as a chamfer 224. Additionally, or alternatively, the transition in the holder sidewall 206 may include at least one tapered region extending between the housing surface 204 and the mounting surface 202. In any event, the optical component holder 200 may be generally described as including at least a base portion 226 that includes the housing surface 204 and a platform portion 228 that includes the mounting region 214. As shown, the platform portion 228 extends from the base portion 226. While, the optical component holder 200 is shown as being an integrally formed component (e.g., a single monolithic structure formed from a single piece of material), the platform portion 228 and the base portion 226 may be two or more separate components coupled to each other using any combination of adhesives, mechanical couplers (e.g., screws, bolts, or snap-fits), press-fits, welds, or any other suitable form of coupling.

As shown, the mounting surface 202 may include one or more optical components 203 coupled thereto. The optical components 203 may be coupled to the mounting surface 202 such that a desired optical alignment of the optical components 203 can be obtained when the optical component holder 200 is coupled to, for example, an optical subassembly such as a transmitter optical subassembly (TOSA) or receiver optical subassembly (ROSA). The mounting region 214 may provide a plurality of predetermined mounting positions, such as shown, for coupling to a plurality of associated optical components. Although three such mounting positions are shown in FIG. 2, this is not intended to limit the present disclosure.

In any event, the mounting surface 202 may define each mounting position. The mounting region 214 may include at least one mounting region sidewall 216 that extends from the mounting surface 202 and at least partially defines a mounting cavity (or receptacle/opening) 218 that includes an inclined portion 220. The inclined portion 220 may provide a mounting angle that ensures optical components coupled thereto are properly aligned with an incident light path when the component holder 200 is coupled to a subassembly housing.

In some instances, the mounting cavity 218 may extend at least partially into the optical component holder 200 such that at least a portion of the components 203 is positioned below the mounting surface 202. Therefore, the inclined portion 220 may extend below the mounting surface 202. The mounting region sidewall 216 may be integrally formed from the optical component holder 200 or may be coupled to the optical component holder 200 using any combination of adhesives, mechanical couplers (e.g., screws, bolts, or snap-fits), press-fits, welds, or any other suitable form of coupling.

A rounded, beveled, sloped, or chamfered portion may be included at a peripheral edge 222 of the mounting region sidewall 216 to provide an alignment feature as variously disclosed herein. The inclusion of such an alignment portion may reduce the risk of damaging the one or more components 203 when coupling the optical component holder 200 to an optical subassembly. Regardless of the configuration of the mounting surface 202, the optical components may include any combination of a filter, mirror, laser diode, lens, diffuser, polarizer, prism, beam splitter, diffraction grating, and/or any other suitable active or passive optical component.

Figure 3A:
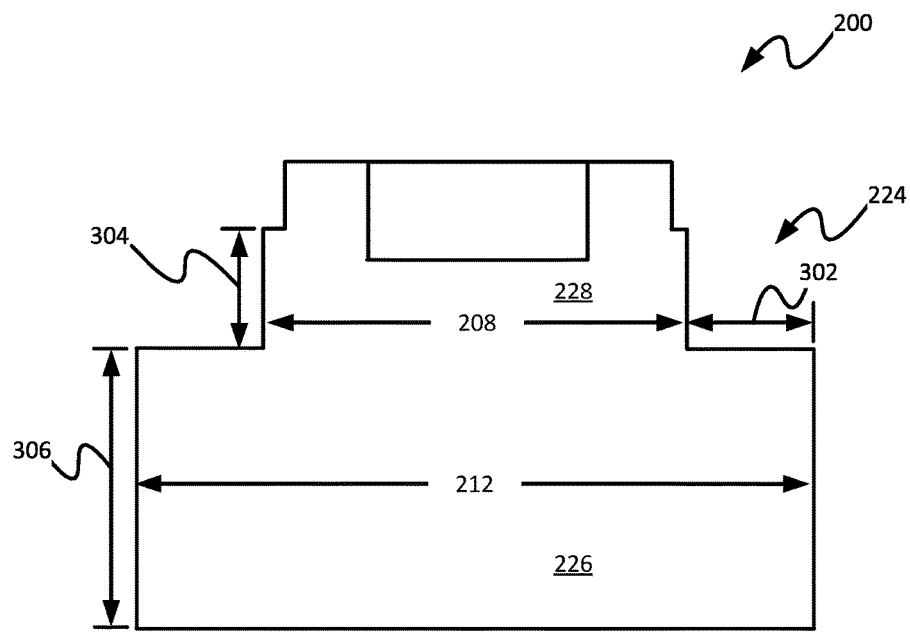
FIG. 3A is a simplified cross-sectional profile view of the optical component holder of FIG. 2 taken along the line A-A, consistent with embodiments of the present disclosure.

FIG. 3A shows a schematic cross-sectional view of the optical component holder 200 of FIG. 2 taken along the line A-A, in accordance with an embodiment of the present disclosure. The proportions of the optical component holder 200 of FIG. 3A have been exaggerated for the purposes of clarity and not by way of limitation. As shown, the stepped region 224 may be defined, at least in part, by a stepped region width 302. In some instances, at least a portion of the stepped region width 302 may be based, at least in part, on a difference between the housing surface width 212 and the mounting surface width 208. For example, the stepped region width 302 may measure half of the difference between the housing surface width 212 and the mounting surface width 208. By way of further example, the housing surface width 212 may measure in a range of 1 millimeters (mm) to 8 mm, the mounting surface width 208 may measure in a range of 0.8 mm to 7 mm, and the stepped region width 302 may measure in a range of 0.01 mm to 1 mm.

Figure 3B:
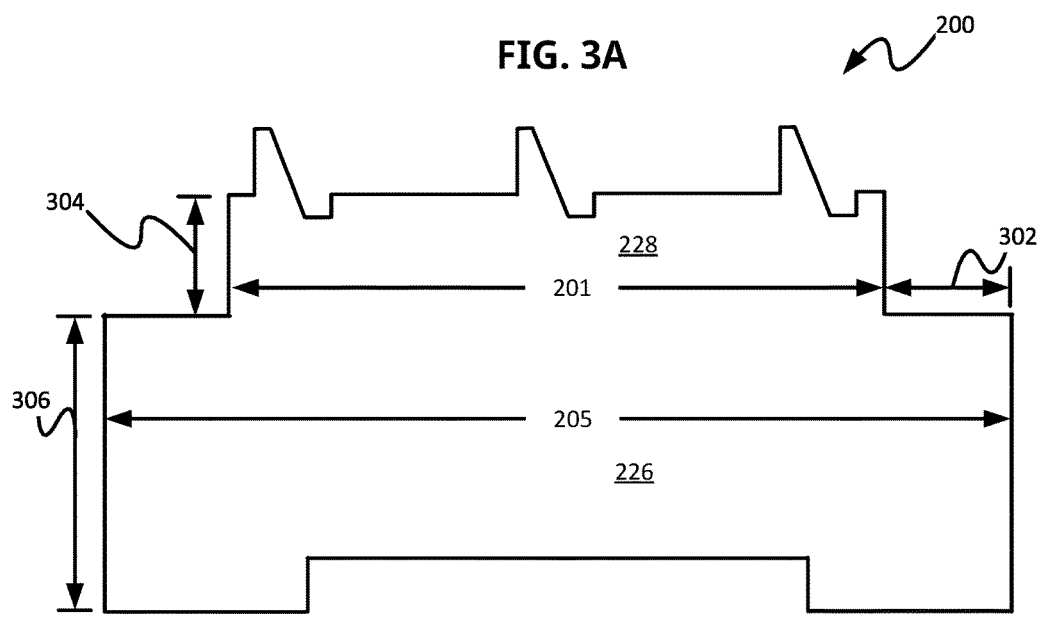
FIG. 3B is a simplified cross-sectional profile view of the optical component holder of FIG. 2 taken along the line B-B, consistent with embodiments of the present disclosure.

FIG. 3B shows a schematic cross-sectional view taken along the line B-B of FIG. 2, in accordance with an embodiment of the present disclosure. The proportions of the optical component holder 200 of FIG. 3B have been exaggerated for the purposes of clarity and not by way of limitation. As shown, in some instances, at least a portion of the stepped region width 302 may be based, at least in part, on a difference between the housing surface length 205 and the mounting surface length 201. For example, the stepped region width 302 may measure half of the difference between the housing surface length 205 and the mounting surface length 201. By way of further example, the housing surface length 205 may measure in a range of 2 millimeters (mm) to 15 mm, the mounting surface length 201 may measure in a range of 1 mm to 14 mm, and the stepped region width 302 may measure in a range of 0.1 mm to 1 mm.

In some instances, the difference between the housing surface length 205 and the mounting surface length 201 may measure equal to the difference between the housing surface width 212 and the mounting surface width 208. In these instances, the stepped region width 302 may be constant. In other instances, the difference between the housing surface length 205 and the mounting surface length 201 may be different from the difference between the housing surface width 212 and the mounting surface width 208. In these instances, the stepped region width 302 may be non-constant. Further, in some instances, one or more of the housing surface length 205, the mounting surface length 201, the housing surface width 212, and/or the mounting surface width 208 may measure different values based on measurement location. In other words, the housing surface length 205, the mounting surface length 201, the housing surface width 212, and/or the mounting surface width 208 may be non-constant.

As shown in both of FIGS. 3A and 3B, the platform portion 228 may be defined, at least in part, by a platform portion height 304 and the base portion 226 may defined, at least in part, by a base portion height 306. In some instances, the platform portion height 304 may measure less than the base portion height 306. For example, a ratio of the platform portion height 304 to the base portion height 306 may be in a range of 1:10 to 1:2. By way of further example, the platform portion height 304 may measure in a range of 0.1 mm to 3 mm and the base portion height 306 may measure in a range of 0.4 mm to 6 mm. In other instances, the platform portion height 304 may measure greater than the base portion height 306. For example, a ratio of the platform portion height 304 to base portion height 306 may be in a range of 10:1 to 2:1. By way of further example, the platform portion height 304 may measure in a range of 1 mm to 4 mm and the base portion height 306 may measure in a range of 0.5 mm to 3 mm, with 0.9 mm being particularly well suited for some embodiments.

Figure 4:
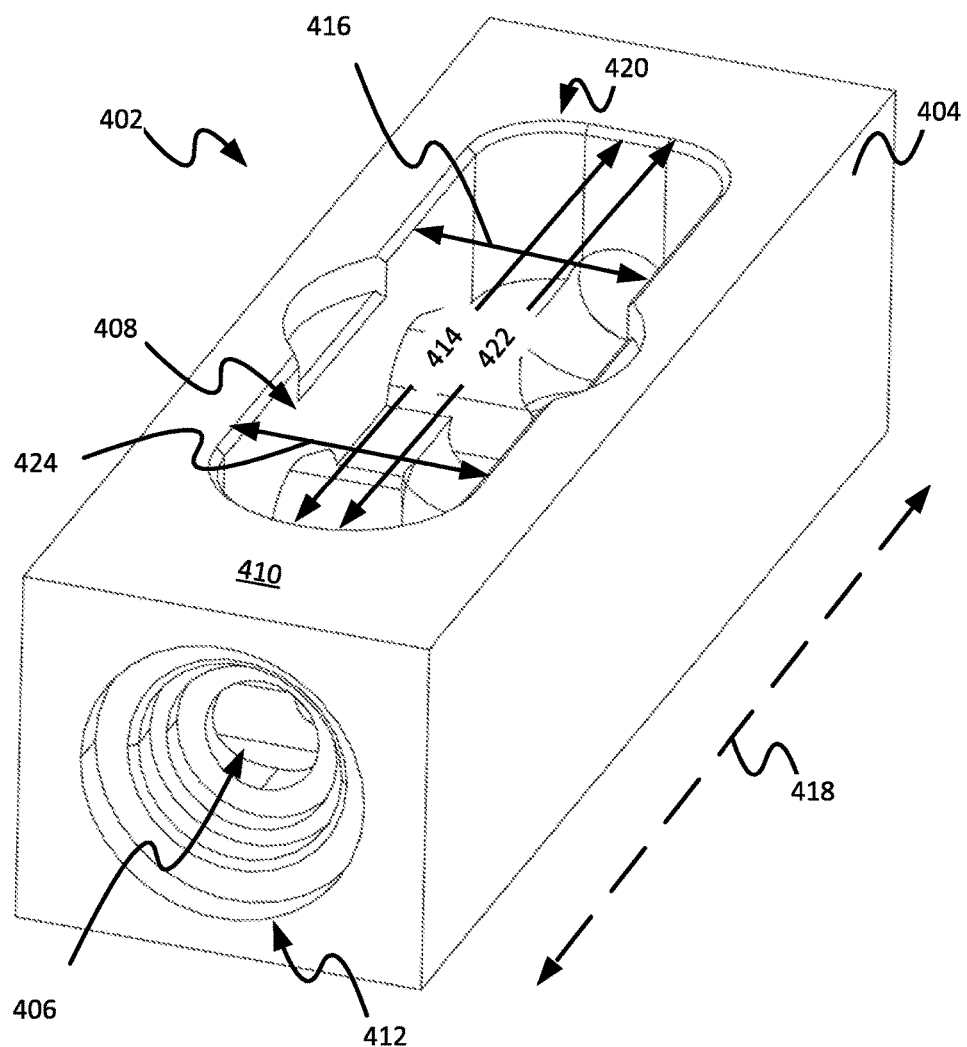
FIG. 4 is a perspective view of an optical subassembly housing configured to receive an optical component holder consistent with embodiments of the present disclosure.

In operation, the optical component holder 200 is coupled to an optical subassembly housing such as an optical subassembly housing for a ROSA or a TOSA. FIG. 4 shows an example of an optical subassembly housing 402 defined by a plurality of subassembly sidewalls 404. The subassembly sidewalls define a cavity 406 extending within the optical subassembly housing 402. An optical component holder opening 408 extends from an outer surface 410 of the optical subassembly housing 402 and into the cavity 406. The optical component holder opening 408 has a shape that generally corresponds to the shape of the optical component holder 200. The optical subassembly housing 402 may also include one or more mounting openings 412 for receiving one or more optical components. The mounting openings 412 may extend into the cavity 406.

As shown, the optical component holder opening 408 may be defined, at least in part, by an optical component holder opening length 414 and an optical component holder opening width 416. The optical component holder opening length 414 may measure a distance parallel to a longitudinal axis 418 of the optical subassembly housing 402 and the optical component holder opening width 416 may measure a distance transverse to the longitudinal axis 418. In some instances, the optical component holder opening length 414 may measure equal to or less than the housing surface length 205 and/or the optical component holder opening width 416 may measure equal to or less than the housing surface width 212 such that a press-fit may be formed between at least a portion of the optical component holder opening 408 and the optical component holder 200.

As shown, a peripheral edge 420 of the optical component holder opening 408 may include, for example, a rounded, beveled, sloped, or chamfered portion. This may result in the optical component holder opening 408 having an initial opening length 422 that is greater than the optical component holder opening length 414 and an initial opening width 424 that is greater than the optical component holder opening width 416. Such a configuration may allow for the optical component holder 200 to be more easily positioned within the optical component holder opening 408.

Figure 5:
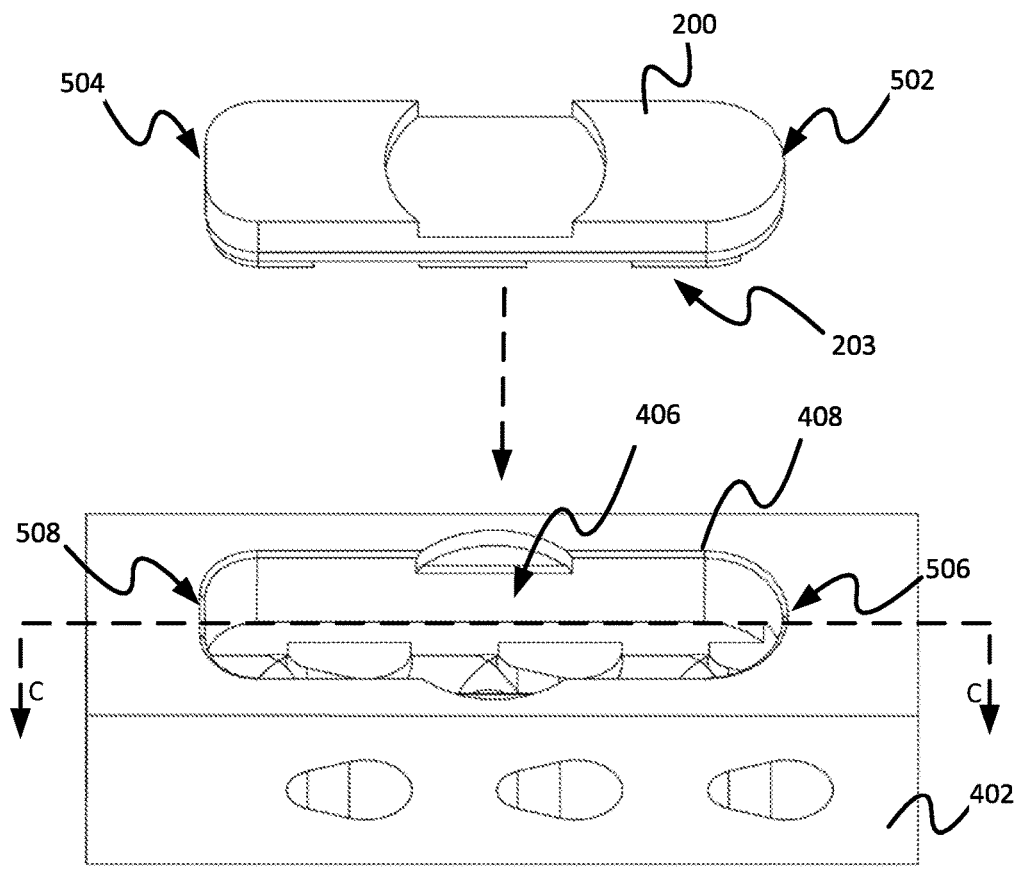
FIG. 5 is an exploded view of an embodiment of an optical subassembly housing and an embodiment of the optical component holder of FIG. 2 consistent with embodiments of the present disclosure.

FIG. 5 shows an exploded view of an example of the optical subassembly housing 402 and optical component holder 200. As shown, the shape of the optical component holder opening 408 generally corresponds to the shape of the optical component holder 200. In some instances, both the optical component holder opening 408 and the optical component holder 200 are asymmetric about at least one axis. When the optical component holder opening 408 and the optical component holder 200 are asymmetric about at least one axis, the optical component holder 200 may be described as being keyed to the optical component holder opening 408. In other words, the optical component holder 200 is only capable of being received within the optical component holder opening 408 according to a single orientation such that the optical components 203 are received within the cavity 406.

In some instances, the optical component holder 200 may include a first holder end opposite a second holder end, wherein the first holder end includes and/or defines a shape different from that of the second holder end. As shown, the optical component holder 200 includes an arcuate holder end 502 and a substantially planar holder end 504 that is opposite the arcuate holder end 502. However, such a configuration is non-limiting. For example, the arcuate holder end 502 and/or the substantially planar holder end 504 may be any shape including, for example, star-shaped, pentagonal shaped, arcuate shaped, square shaped, rectangle shaped, trapezoid shaped, and/or any other suitable shape. In some instances, both the first and second holder ends may be arcuate shaped such that a "tear-drop shape," "pear shape," and/or piriform curve shape is formed, as is discussed in more detail in U.S. patent application Ser. No. 15/241,979 filed on Aug. 19, 2016, entitled "An optical component assembly having a keyed structure for ensuring proper insertion orientation within an optical subassembly," which is incorporated herein by reference in its entirety.

Similarly, the optical component holder opening 408 may also include a first opening end opposite a second opening end, wherein the first opening end includes and/or defines a shape different from that of the second opening end. The first and second opening ends of the optical component holder opening 408 may generally correspond to the first and second end of the optical component holder 200. For example, as shown, the optical component holder opening 408 includes an arcuate opening end 506 and a substantially planar opening end 508 opposite the arcuate opening end 506. However, such a configuration is non-limiting. For example, the arcuate opening end 506 and the substantially planar opening end 508 may be any shape including, for example, star-shaped, pentagonal shaped, arcuate shaped, square shaped, rectangle shaped, trapezoid shaped, and/or any other suitable shape. In some instances both the first and second opening ends may be arcuate shaped such that a "tear-drop shape," "pear shape," and/or piriform curve shape is formed.

Figure 6:
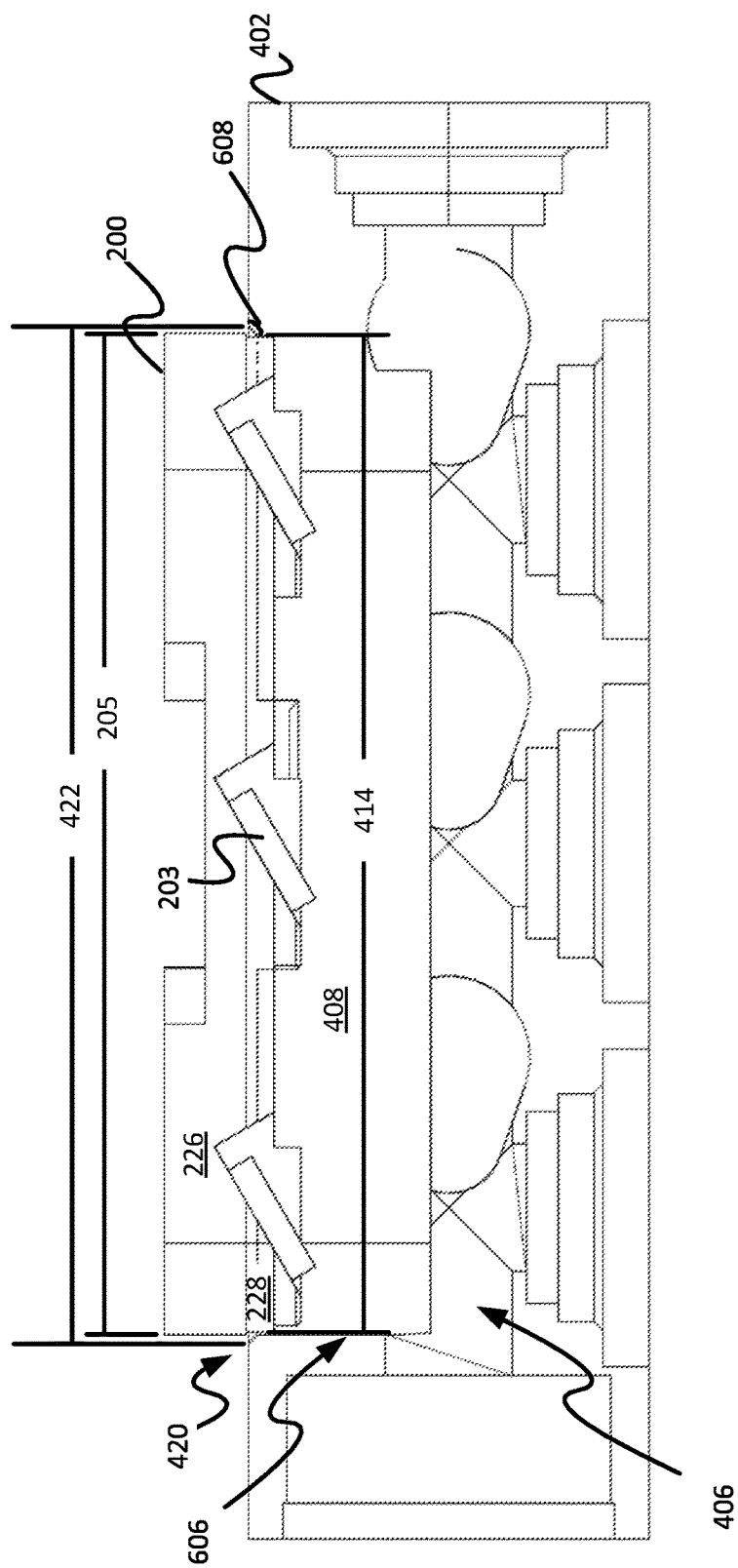
FIG. 6 is a cross-sectional view of the optical subassembly housing taken along the line C-C of FIG. 5 and shows an optical component holder in an alignment position prior to insertion, in accordance with an embodiment of the present disclosure.

FIG. 6 shows a cross-sectional view taken along the line C-C of FIG. 5 showing the optical subassembly housing 402 having the optical component holder 200 positioned partially within the optical component holder opening 408. As shown, prior to press-fitting the optical component holder 200 into the optical component holder opening 408, the platform portion 228 may be movably positioned within the optical component holder opening 408. In some instances, one or more sides of the platform portion 228 may slideably engage (without necessarily forming a press-fit) at least a portion of one or more optical component holder opening sidewalls 606. For example, opposing sides of the optical component holder 200 may slideably engage at least a portion of the optical component holder opening sidewall 606. In other instances, the platform portion 228 may be spaced a predetermined distance from the optical component holder opening sidewall 606 such that the platform portion 228 does not engage the optical component holder opening sidewall 606.

As also shown, the peripheral edge 420 of the optical component holder opening 408 includes a sloped portion 608, such as a bevel and/or a chamfer. The sloped portion 608 transitions from the initial opening length 422 to the optical component holder opening length 414, wherein the initial opening length 422 measures greater than the housing surface length 205. Although not shown in FIG. 6, the sloped portion 608 may transition from the initial opening width 424 to the optical component holder opening width 416, wherein the initial opening width 424 measures greater than the housing surface width 212. Accordingly, when the optical component holder 200 is positioned within the optical component holder opening 408, the base portion 226 at least partially engages the sloped portion 608. The engagement between the base portion 226 and the sloped portion 608 may encourage an alignment of a center of the optical component holder 200 with a center of the optical component holder opening 408.

Figure 7:
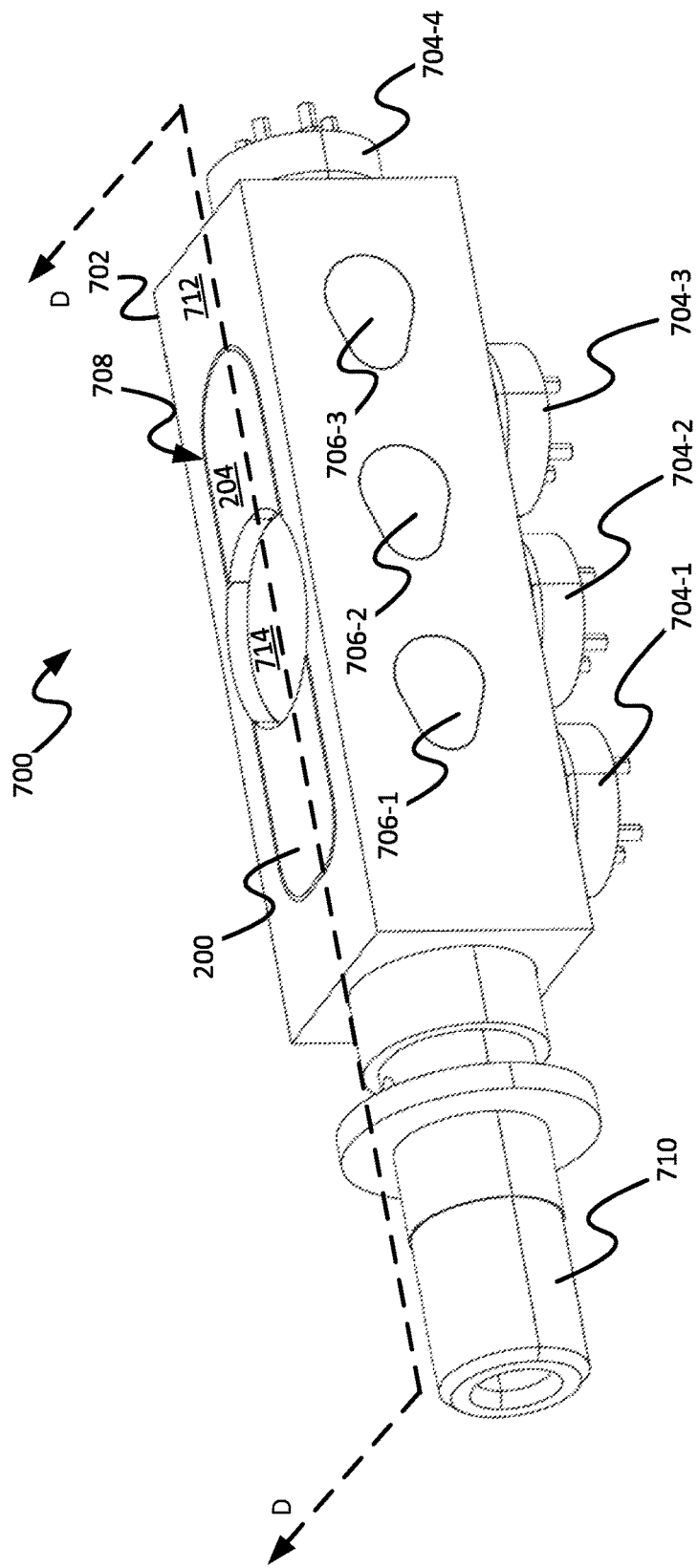
FIG. 7 is a perspective view of a receiver optical subassembly (ROSA) having the optical component holder of FIG. 2 coupled thereto, in accordance with an embodiment of the present disclosure.

FIG. 7 shows an assembled ROSA 700 having a ROSA housing 702. The ROSA 700 may include photodiode packages 704-1 to 704-4 coupled to corresponding openings in the ROSA housing 702, optical assemblies 706-1 to 706-3 coupled to corresponding openings in the ROSA housing 702, the optical component holder 200 may be coupled to an optical component holder opening 708, and an optical coupling receptacle 710 coupled to a corresponding opening in the ROSA housing 702.

As shown, the housing surface 204 of the optical component holder 200 may be substantially co-planar (e.g., within manufacturing tolerances) with an outer surface 712 of the ROSA housing 702. When the housing surface 204 is substantially co-planar with the outer surface 712 of the ROSA housing 702, it may indicate the optical components 203 have a desired optical alignment within a cavity extending through the ROSA housing 702. As also shown, the optical component holder 200 and the ROSA housing 702 may define a receptacle 714 (or recessed region 714) for receiving a portion of, for example, an optical subassembly positioned adjacent the ROSA housing 702 in a transceiver as is described more fully in U.S. patent application Ser. No. 14/838,017 filed on Aug. 27, 2015, entitled "Receiver optical subassembly (ROSA) housing with sidewall receptacle to provide electrical isolation between an adjacent transmitter optical subassembly (TOSA) in a transceiver housing," which is incorporated herein by reference in its entirety. The receptacle 714 may include a material that is electrically non-conductive to prevent an electrical short between the ROSA housing 702 and adjacent components, e.g., such as an adjacent TOSA.

Figure 8:
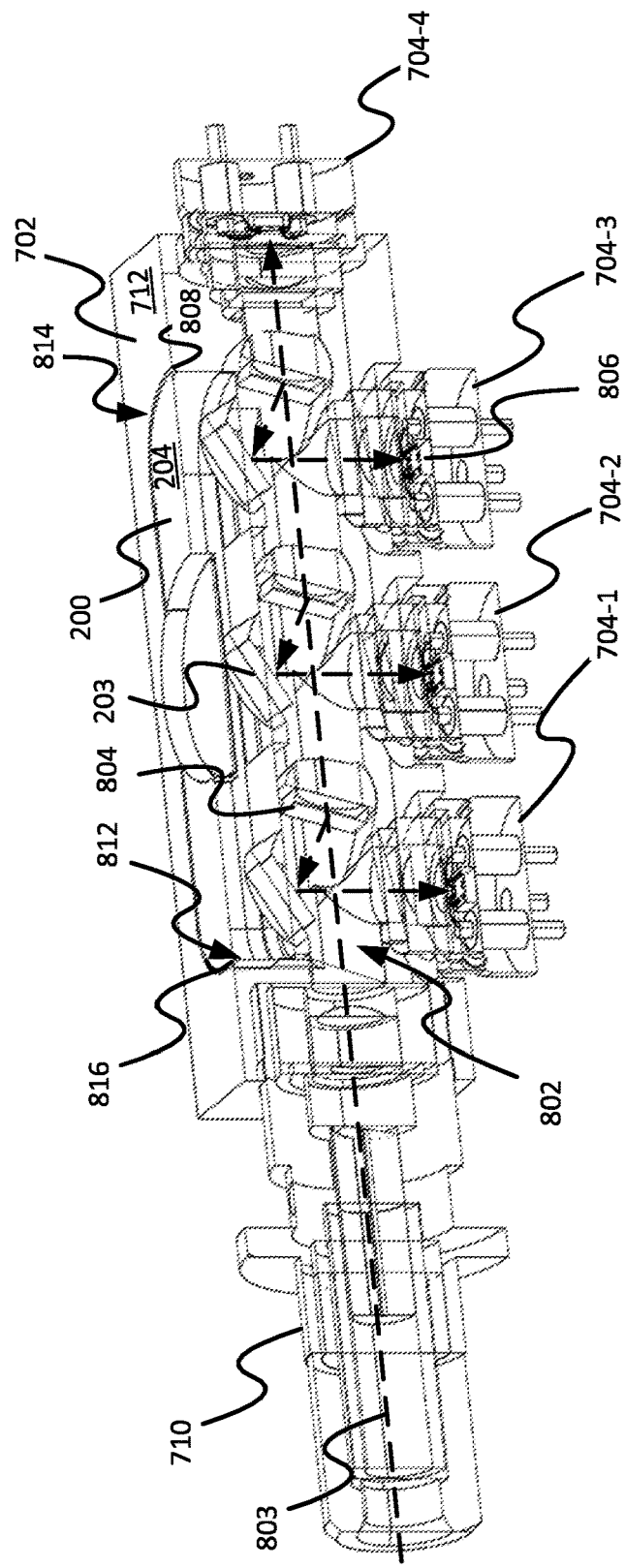
FIG. 8 is a cross-sectional view of the ROSA of FIG. 7 taken along the line D-D, in accordance with an embodiment of the present disclosure.

FIG. 8 is a cross-sectional view taken along the line D-D of FIG. 7. As shown, the optical components and/or elements 203 coupled to the optical component holder 200 are positioned within a ROSA cavity 802 extending within the ROSA housing 702. The optical components and/or elements 203 may be aligned with a light path 803 extending between the optical coupling receptacle 710 to the photodiode package 704-4. As shown, the optical components and/or elements 203 may include one or more mirrors such that channel wavelengths reflected from an optical component 804 can be reflected into, for example, a photodiode 806 within a respective one of the photodiode packages 704-1 to 704-3. The optical component 804 may be capable of selectively allowing a portion of the light to pass through the optical component 804. In other words, each optical component 804 may reflect one or more wavelengths of light and may allow one or more wavelengths of light to pass through the optical component 804. As such, the optical component 804 may be generally described as an optical filter. In some instances, the optical component 804 may include a filter, mirror, laser diode, lens, diffuser, polarizer, prism, beam splitter, diffraction grating, and/or any other suitable active or passive optical component.

As also shown in FIG. 8, when a sloped portion 808 is included at a peripheral edge of the optical component holder opening 812, a gap 814 may be present between the optical component holder 200 and the ROSA housing 702. An interstitial filler and/or sealant 816 may be applied at, for example, the sloped portion 808 to fill at least a portion of the gap 814. In some instances, the interstitial filler and/or sealant 816 fills the gap 814 such that the interstitial filler and/or sealant 816 is substantially co-planar with the housing surface 204 of the optical component holder 200 and/or the outer surface 712 of the ROSA housing 702. The interstitial filler and/or sealant 816 may prevent, reduce, or otherwise mitigate the ingress of contaminants into the ROSA cavity 802 via the optical component holder opening 812.

Additional Example Embodiments

In accordance with an aspect of the present disclosure an optical component holder is disclosed. The optical component holder comprising an elongated base portion having a wall that extends from a first end to a second end along a longitudinal axis of the elongated base portion, a mounting region for coupling to at least one optical component, and wherein the wall of the base portion includes a first diameter that transitions to a second diameter to form a step region, the first diameter being less than the second diameter to allow the step region of the elongated base portion to at least partially extend into an opening of a subassembly housing for alignment purposes prior to insertion of the base portion having the second diameter into the opening to form a press-fit.

In accordance with another aspect of the present disclosure an optical subassembly is disclosed. The optical subassembly comprising a housing having a plurality of sidewalls, the plurality of sidewalls defining a cavity within the housing, an opening disposed on a sidewall of the plurality of sidewalls, and an optical component holder disposed at least partially within the opening, wherein the optical component holder includes a base portion having a wall that extends from a first end to a second end along a longitudinal axis of the base portion, a mounting region for coupling to at least one optical component, and wherein the wall of the base portion includes a first diameter that transitions to a second diameter to form a step region, the first diameter being less than the second diameter to allow the step region of the base portion to at least partially extend into an opening of a subassembly housing for alignment purposes prior to insertion of the base portion having the second diameter into the opening to form a press-fit.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical component holder comprising:
    an elongated base portion defined by a wall that extends from a first end to a second end along a longitudinal axis of the elongated base portion;
    a mounting region defined by a surface of the base portion, the mounting region for coupling to at least one optical component; and
    wherein the base portion is defined by a first portion having a first crosswise width that transitions to a second portion having a second crosswise width, the first crosswise width being less than the second crosswise width to define a step region, the step region configured to allow the first portion of the elongated base portion to at least partially extend into a sidewall opening of a subassembly housing for alignment purposes prior to insertion of the second base portion into the sidewall opening to form a press-fit.

2. The optical component holder of claim 1, wherein the step region includes a step region surface defined at least in part by the first portion of the elongated base portion, the step region surface having a width that is uniform around a perimeter of the elongated base portion.

3. The optical component holder of claim 1, wherein the elongated base portion includes a recessed region disposed opposite the mounting region.

4. The optical component holder of claim 1, wherein the elongated base portion is defined by a first arcuate region adjacent the first end and a second arcuate region adjacent the second end.

5. The optical component holder of claim 1, wherein the first end of the elongated base portion includes a shape different from that of the second end of the elongated base.

6. The optical component holder of claim 1, wherein the mounting region includes at least one opening for receiving and coupling to the at least one optical component.

7. The optical component holder of claim 6, further comprising at least one optical component coupled to a surface defining the at least one opening, and wherein the surface of the at least one opening includes a predetermined angle relative to a surface of the mounting region.

8. The optical component holder of claim 1, wherein the at least one optical component is a mirror configured to reflect incident light.

9. An optical subassembly comprising:
    a housing having a plurality of sidewalls, the plurality of sidewalls defining a cavity within the housing;
    an opening disposed on a sidewall of the plurality of sidewalls; and
    an optical component holder disposed at least partially within the opening, wherein the optical component holder includes:
        a base portion defined by a wall that extends from a first end to a second end along a longitudinal axis of the base portion;
        a mounting region defined by a surface of the base portion, the mounting region for coupling to at least one optical component; and
        wherein the base portion is defined by a first portion having a first crosswise width that transitions to a second portion having a second crosswise width, the first crosswise width being less than the second crosswise width to define a step region, the step region configured to allow the first portion of the base portion to at least partially extend into the opening of a subassembly housing for alignment purposes prior to insertion of the second base portion into the opening to form a press-fit.

10. The optical subassembly of claim 9, wherein the step region includes a step region surface defined at least in part by the first portion of the base portion, the step region surface having a width that is uniform around a perimeter of the base portion.

11. The optical subassembly of claim 9, wherein the base portion includes a recessed region disposed opposite the mounting region.

12. The optical subassembly of claim 9, wherein the base portion provides a substantially flat surface that is coplanar with a surface of the sidewall when the optical component holder is press fit into the sidewall opening.

13. The optical subassembly of claim 9, wherein the base portion is defined by a first arcuate region adjacent the first end and a second arcuate region adjacent the second end.

14. The optical subassembly of claim 9, wherein the first end of the base includes a shape different from that of the second end of the base portion.

15. The optical subassembly of claim 9, wherein the mounting region includes at least one opening for receiving and coupling to the at least one optical component.

16. The optical subassembly of claim 15, further comprising at least one optical component coupled to a surface defining the at least one opening, and wherein the surface of the at least one opening includes a predetermined angle relative to a surface of the mounting region.

17. The optical subassembly of claim 9, further comprising a plurality of optical components coupled to the mounting region.

18. The optical subassembly of claim 9, wherein the at least one optical component is a mirror configured to reflect incident channel wavelengths.

19. The optical subassembly of claim 9 implemented as a receiver optical subassembly.

* * * * *